United States Patent [19]
Adams et al.

[11] Patent Number: 5,557,255
[45] Date of Patent: Sep. 17, 1996

[54] ANTITHEFT DEVICE FOR A VEHICLE AND METHOD OF INSTALLING THE SAME

[76] Inventors: Steven M. Adams, 4019 E. Holmes Ave., Mesa, Ariz. 85206; Curtis Paynter, 1142 N. 95th Pl., Mesa, Ariz. 85207

[21] Appl. No.: 319,079

[22] Filed: Oct. 6, 1994

[51] Int. Cl.⁶ .................................................. B60R 25/10
[52] U.S. Cl. ........................ 340/426; 180/287; 307/10.2; 307/10.6
[58] Field of Search ...................... 340/426, 428, 340/430; 180/287; 307/10.2, 10.3, 10.6

[56] References Cited

U.S. PATENT DOCUMENTS

| | | |
|---|---|---|
| 4,301,441 | 11/1981 | Baxter . |
| 4,335,370 | 6/1982 | Scalley et al. ........................ 340/426 |
| 4,963,856 | 10/1990 | Yukitomo . |
| 4,983,947 | 1/1991 | Mullen et al. . |
| 5,049,867 | 9/1991 | Stouffer . |
| 5,061,915 | 10/1991 | Murphy . |
| 5,086,288 | 2/1992 | Stramer ................................ 340/426 |
| 5,103,932 | 4/1992 | Hansen et al. ....................... 340/426 |
| 5,172,094 | 12/1992 | Stadler . |
| 5,216,407 | 6/1993 | Hwang . |
| 5,218,338 | 6/1993 | Chang . |
| 5,280,268 | 1/1994 | Matthews ............................. 340/426 |
| 5,315,286 | 5/1994 | Nolan ................................... 340/426 |

OTHER PUBLICATIONS

Is Your Car Where You Left It? DP Products Brochure.

*Primary Examiner*—Brent A. Swarthout
*Attorney, Agent, or Firm*—Parsons & Associates; Robert A. Parsons; Michael W. Goltry

[57] ABSTRACT

In a motorized vehicle having an electrical system, a common ground, a horn, a battery, an electronic control module, and a key switch, an antitheft device, and a method of installing the same, the device including a first switch connected to the vehicle engine, a momentary switch for disengaging the vehicle engine, and a first relay for energizing the first switch when the momentary switch is in a closed position such that the vehicle engine can only be engaged after the User has closed the momentary switch.

12 Claims, 1 Drawing Sheet

1

ANTITHEFT DEVICE FOR A VEHICLE AND METHOD OF INSTALLING THE SAME

BACKGROUND OF THE INVENTION

1. Field of the Invention

The invention relates to an antitheft system for an automotive vehicle. More particularly, the invention relates to such a system connected to the electrical system of a conventional vehicle thereby preventing the vehicle engine from running without the User first turning a key switch to a run position and then activating a momentary switch. In this manner, an unauthorized user of the vehicle will be unable to start the vehicle engine.

2. Description of the Prior Art

Vehicles have been provided with antitheft systems and with alarm systems. However, the majority of vehicle thefts occur when the ignition key is inadvertently left in an unoccupied vehicle, when the vehicle is push started, or when the vehicle is "hot wired". A system to prevent unauthorized use of the vehicle under these circumstances would, therefore, prevent a majority of vehicle thefts.

Murphy, U.S. Pat. No. 5,061,915, entitled ANTI-THEFT DEVICE FOR MOTORIZED VEHICLES, discloses a device wherein an alarm is energized and the vehicle starter is disabled when there is an attempt to start the vehicle without following a prescribed sequence of disarming steps. However, the Murphy device can be bypassed at the vehicle starter by an unauthorized user because the device only disarms the starter and not the engine itself. In addition, the Murphy device continually draws power from the vehicle battery while in the valet mode so that if battery power is lost for any reason, the alarm will sound when the power is restored.

Baxter, U.S. Pat. No. 4,301,441, entitled ALARM AND ANTITHEFT SYSTEM FOR AN AUTOMOTIVE VEHICLE, discloses an alarm and antitheft system which disables the starter of the vehicle. The Baxter system has the same drawbacks of the Murphy system. In addition, the Baxter system includes numerous relays and switches which results in a high manufacturing cost and installation of the system.

SUMMARY OF THE INVENTION

The invention is designed to allow only an authorized User to engage the vehicle's computer or fuel system by using an existing momentary switch or a combination of momentary switches. The momentary switch selected to allow engagement of the vehicle computer or fuel system (collectively referred to as "the motor"), should preferably not interrupt the original function of the particular switch. In other words, the switch used should be normally open so that the antitheft system will not be bypassed by inadvertently leaving the switch on when the ignition is turned off, such that the system is not automatically reset. Choices for the momentary switches include, but are not limited to, the cruise control, turn signals, door lock, electric rearview or side mirrors, windshield wiper, brake light, power seat adjustment, and lumbar adjustment.

In a vehicle having an electronic control module (ECM), also called a vehicle computer, the device is electrically connected to the wire which runs from the ignition switch to the computer. In this manner, the ECM is not engaged until the proper momentary switch is closed, but not before the ignition switch is turned to the run position by the User. Keeping the ECM disengaged results in no distributor pulse and no injector activation, meaning the vehicle will not run, regardless of the ignition crank position. Thus, the vehicle cannot be started by merely bypassing the starter. In addition, the antitheft system can be electrically connected to the vehicle horn so that the horn will sound when the ignition key switch is placed in the start position.

In another embodiment, the device is electrically connected to the electric fuel pump relay feed wire which prevents fuel from reaching the engine unless the proper momentary switch is closed by the User.

The invention also includes a valet mode. The valet mode allows the User to completely deactivate the antitheft system which allows another person to operate the vehicle. The valet mode switch can be installed within the vehicle in a location of the User's choice.

In a vehicle having a carburetor and no ECM, the device further includes a fuel cut-off switch which is installed in the fuel line. The switch allows fuel to flow into the carburetor when the switch receives electrical current to hold it open. The switch receives electric current when the ignition key switch is in the run position and when the momentary switch is closed by the user. The fuel switch automatically resets to the closed position when the ignition key is turned to the off position. A two tank toggle switch may be used wherein one tank is the designated open position and tank two is the designated closed position of the fuel switch. As an additional safety feature of this embodiment, the vehicle distributor is also disabled which prevents the engine from starting and running on fuel held in the fuel line between the cut-off switch and the carburetor which would allow the engine to run for approximately thirty seconds.

The invention further includes a buzzer. The buzzer reminds the User that the device is operating and that the engine may be engaged by closing the appropriate momentary switch.

The invention includes numerous benefits. The system automatically resets itself each time the ignition is turned to the off position, regardless of ignition key removal. The User does not need to carry a remote or remember a password or a complicated code. The system is inexpensive to manufacture, and easy to install. In addition, Users of the system may be eligible for an insurance discount because the system is not merely an audible alarm requiring human interaction to prevent a theft, but is instead an engine disabling device.

Therefore, it is an object of the invention to provide an improved anti-theft system for an automotive vehicle.

Another object is to provide a system which frustrates unauthorized operation of the vehicle by disabling the vehicle engine, not merely disabling the vehicle starter.

Another object is to provide a system which includes relatively few relays and switches so that the system is inexpensive to manufacture and easy to install.

Another object is to provide a system which does not continuously draw power from the vehicle battery while in valet mode.

Another object is to provide a system which is automatically activated and easily deactivated by a User.

Further objects and advantages will be apparent from the figures and the detailed description given below.

DETAILED DESCRIPTION OF THE PREFERRED EMBODIMENTS

Figure 1:
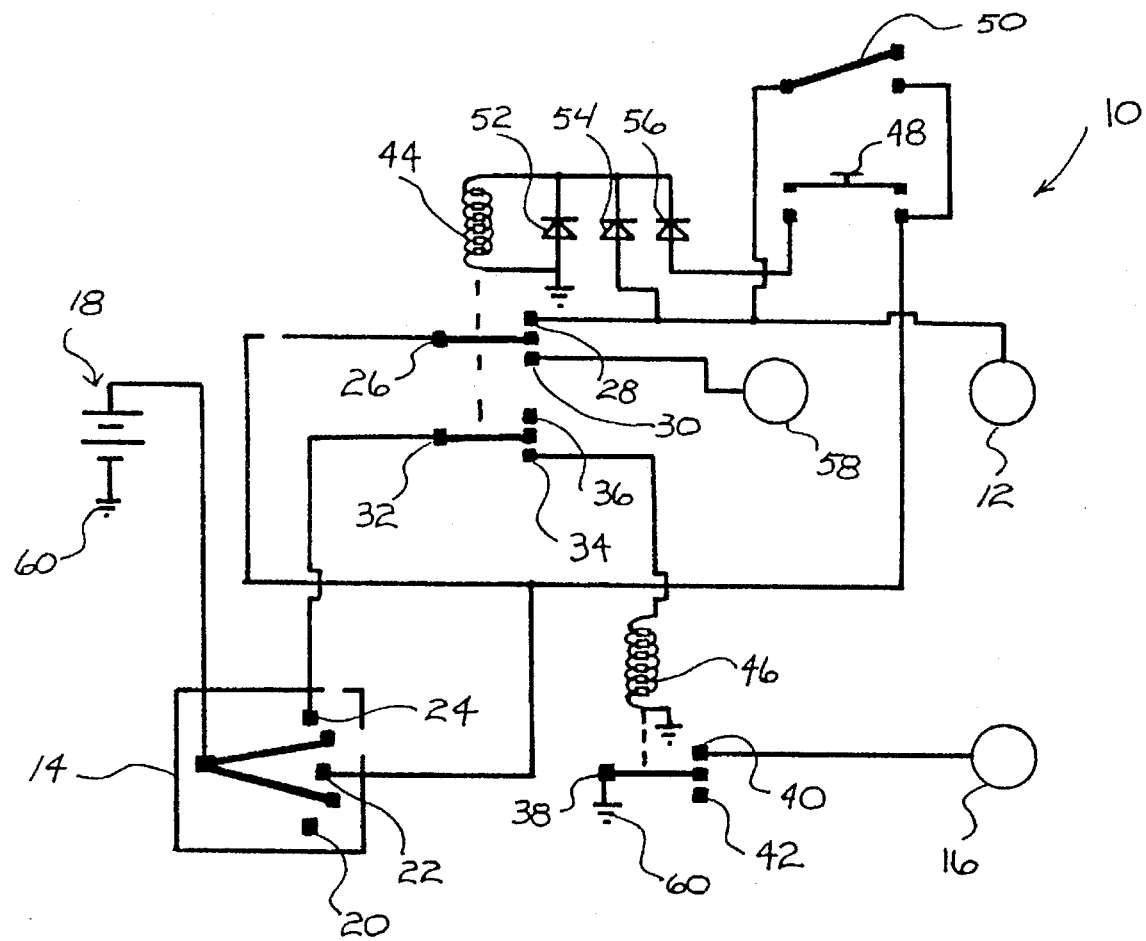
FIG. 1 is an electrical circuit diagram of the antitheft device together with related elements of an automotive

FIG. 1 shows an electrical circuit diagram of the antitheft device 10 with related elements of an automotive vehicle equipped with the system. Elements of the vehicle include a motor 12, an ignition key switch 14, a horn 16, and a battery 18 having a common ground 60. Key switch 14 includes an off pole 20, a run pole 22, and a start pole 24. In a first embodiment of the invention, installed in modern computerized vehicles, motor 12 is an electronic control module (ECM). In the second embodiment of the invention, installed in older cars having no computer, motor 12 is fuel switch installed as part of the device in the feed line of the vehicle's carburetor.

Device 10 includes a first switch 26 having a first pole 28, a second pole 30, a second switch 32 having a first pole 34 and a second pole 36, and a third switch 38 having a first pole 40 and a second pole 42. Antitheft device 10 further includes a first relay 44, a second relay 46, a momentary switch 48, and a valet switch 50. Device 10 also includes a surge diode 52, lock loop diode 54, antifeedback diode 56, and a buzzer 58. In the second embodiment, device 10 further includes fuel switch 12.

To install the device, first switch 26 is electrically connected to run pole 22 of the key switch, first switch first pole 28 is electrically connected to motor 12, and first switch second pole 30 is electrically connected to installed buzzer 58. Typically, buzzer 58 is installed under the vehicle dashboard or in the steering column so that the vehicle User can hear the buzzer when the buzzer is activated. Second switch 32 is electrically connected to the start pole of the key switch, second switch first pole 34 is electrically connected to second relay 46, and second switch second pole 36 is left unconnected. Third switch first pole 40 is electrically connected to horn 16 and third switch second pole 42 is left unconnected. Momentary switch 48 is connected to run pole 22 of the key switch or to battery power 18 and to first relay 44 through antifeedback diode 56. Lock loop diode 54 is electrically connected to first relay 44 and to first switch first pole 28. When pole 28 is energized, diode 54 is energized which keeps first relay 44 energized until the key is switched to the off position. Surge diode 52 is electrically connected to first relay 44 and to the vehicle ground 60. In addition, first relay 44, second relay 46 and third switch 38 are connected to vehicle ground 60.

In operation, a User inserts the vehicle ignition key into key switch 14. The User then turns the ignition key thereby powering run pole 22 of the key switch. This in turn powers first switch 26 which is in the automatic reset position of second pole 30. First switch second pole 30 then energizes buzzer 58, reminding the User that the antitheft device is in vehicle disable mode. If the User then turns the key to start position 24, thereby powering the start pole, second switch first pole 34 is energized, which is the automatic reset position of second switch 32, which in turn energizes second relay 46. Second relay 46 then energizes first pole 40 of third switch 38, which is the active position of third switch 38, thereby activating vehicle horn 16. In other words, the ECM of the vehicle is disabled and the horn is sounded whenever the User tries to crank the vehicle ignition without first closing momentary switch 48.

To enable the vehicle engine, the User closes momentary switch 48. Momentary switch 48 can be any switch chosen by the User at installation, including, but not limited to, the cruise control, turn signals, door lock, electric mirror or side mirrors, windshield wiper, brake light, power seat adjustment, or the lumbar adjustment. The switch used should be normally open, meaning a switch that is not in the on position when the vehicle ignition is turned to the off position. With momentary switch 48 in the closed position the engine is enabled. More specifically, when the User turns the key to run position 22 and then switches momentary switch 48 to the closed position, first relay 44 will be energized which energizes second switch second pole 36, which in turn disengages the vehicle horn. In addition, first switch first pole 28 is energized which disengages buzzer 58 and energizes ECM 12, enabling the vehicle to run.

In the second embodiment, used for non-ECM vehicles, closing momentary switch 48 energizes fuel switch 12 which allows fuel to flow to the vehicle carburetor. As an added safety precaution, the vehicle's spark plug coils may be electrically connected to the antitheft device. Thus, the coils would be disengaged by momentary switch 48 in the open position so that the vehicle would not run on the small amount of fuel remaining in the fuel line between the fuel switch and the carburetor. In another embodiment, a combination of momentary switches may be added to further ensure the safety of the vehicle.

When taking the car to a mechanic or when otherwise desiring to turn the antitheft device off, the user activates the valet mode by closing valet switch 50 which temporarily bypasses the device's engine disabling mode. To activate valet mode, the User closes valet switch 50. Valet switch 50 is installed at the User's desired location such as under the dashboard or in the glove compartment.

Although the invention has been shown herein and described in what is conceived to be the most practical and preferred embodiments, it is recognized that departures may be made therefrom within the scope of the invention, which is not to be limited to the illustrated details disclosed.

It is claimed and desired to secure by Letters Patent:

1. (Twice Amended) In a motorized vehicle having an electrical system, a common ground, a horn, a battery, an electronic control module, and a key switch having an off pole, a run pole and a start pole, a concealed anti-theft device comprising:

a first switch connected to the run pole, the first switch having a first pole connected to the vehicle electronic control module;

a concealed momentary switch connected to the run pole, the momentary switch moved between a closed position and an open position by a vehicle operator;

a first relay operatively associated with the momentary switch, the first relay energized when the momentary switch is moved to the closed position after the run pole of the key switch is powered, the first relay is kept energized by a lock loop after the momentary switch is moved to the open position and when the run pole or the start pole of the key switch is powered, the energized first relay energizes the first switch first pole, thereby powering the vehicle electronic control module; and a valet switch having an open position and a closed position, the valet switch connecting the run pole of the key switch to the vehicle electronic control module when the valet switch is in the closed position, bypassing the momentary switch and powering the electronic control module when the run pole or start pole of the key switch is powered.

2. The anti-theft device of claim 1 wherein the first switch includes a second pole, connected to a buzzer and wherein the buzzer is powered when the momentary switch is in an open position and the run pole of the key switch is powered.

3. The anti-theft device of claim 1 further comprising a second switch connected to the start pole of the key switch and a third switch having a first pole connected to the vehicle horn, the second switch having a first pole operatively associated with a second relay, the second relay powering the third switch first pole and thereby powering the vehicle horn when the momentary switch is in an open position and the start pole of the key switch is powered.

4. In a motorized vehicle having an electrical system, a common ground, a horn, a battery, a carburetor, and a key switch having an off pole, a run pole and a start pole, a concealed anti-theft device comprising:

a first switch connected to the run pole, the first switch having a first pole connected to a fuel switch having a closed position and an open position, the fuel switch connected to the carburetor;

a concealed momentary switch connected to the run pole, the momentary switch moved between a closed position and an open position by a vehicle operator; and a first relay operatively associated with the momentary switch, the first relay energized when the momentary switch is moved to the closed position after the run pole of the key switch is powered, the first relay is kept energized by a lock loop after the momentary switch is moved to the open position and when the run pole or the start pole of the key switch is powered, the energized first relay energizes the first switch first pole thereby placing the fuel switch in the open position and allowing fuel to the carburetor; and a valet switch having an open position and a closed position, the valet switch connecting the run pole of the key switch to the fuel switch when the valet switch is in the closed position, bypassing the momentary switch and placing the fuel switch in the open position when the run pole or start pole of the key switch is powered.

5. The anti-theft device of claim 4 wherein the first switch includes a second pole connected to a buzzer and wherein the buzzer is powered when the momentary switch is in an open position and the run pole of the key switch is powered.

6. The anti-theft device of claim 4 further comprising a second switch connected to the start pole of the key switch and a third switch having a first pole connected to the vehicle horn, the second switch having a first pole operatively associated with a second relay, the second relay powering the third switch first pole and thereby powering the vehicle horn when the momentary switch is in an open position and the start pole of the key switch is powered.

7. In a motorized vehicle having an electrical system, a common ground, a horn, a battery, a motor, and a key switch having a run pole and a start pole, a method of installing an anti-theft device comprising the steps of:

providing a first switch having a first pole and a second pole;

electrically connecting the first switch to the run pole of the key switch;

electrically connecting the first switch first pole to the vehicle motor;

providing a momentary switch having an open position and a closed position;

concealing the momentary switch by selecting a switch already present in the vehicle for another function to be additionally used as the momentary switch;

electrically connecting the momentary switch to the run pole of the key switch;

providing a first relay; and operatively associating the momentary switch and the first relay such that the first relay is energized when the momentary switch is in the closed position and when the run pole or the start pole of the key switch is powered, the energized first relay powers the first switch first pole, permitting operation of the vehicle motor.

8. The method of claim 7 further comprising the steps of:

providing a buzzer; and electrically connecting the first switch second pole to the buzzer.

9. The method of claim 7 further comprising the steps of:

providing a second switch having a first pole;

providing a third switch having a first pole;

electrically connecting the second switch to the start pole of the key switch;

electrically connecting the third switch first pole to the vehicle horn;

providing a second relay; and operatively associating the second switch first pole and the second relay such that the second relay powers the third switch first pole when the momentary switch is in the open position and when the start pole of the key switch is powered.

10. The method of claim 7 further comprising the step of electrically connecting a valet switch to the run pole of the key switch and to the vehicle motor.

11. The method of claim 7 wherein the motor is a vehicle's electronic control module.

12. The method of claim 7 wherein the motor is a fuel switch.

* * * * *

UNITED STATES PATENT AND TRADEMARK OFFICE
CERTIFICATE OF CORRECTION

PATENT NO. : 5,557,255
DATED : September 17, 1996
INVENTOR(S) : Steven M. Adams
James Curtis Paynter It is certified that error appears in the above-indentified patent and that said Letters Patent is hereby corrected as shown below:

Item (76) of the cover page of the patent, replace "Curtis Paynter" with --James C. Paynter--.

Signed and Sealed this

Twenty-first Day of January, 1997

Attest:

BRUCE LEHMAN

*Attesting Officer*    *Commissioner of Patents and Trademarks*